United States Patent
Rafferty et al.

(10) Patent No.: US 9,196,467 B2
(45) Date of Patent: Nov. 24, 2015

(54) MASS SPECTRUM NOISE CANCELLATION BY ALTERNATING INVERTED SYNCHRONOUS RF

(71) Applicants: David Rafferty, Webster, TX (US); David Lorenz Gardner, League City, TX (US); James Wylde, Oak Leaf, TX (US)

(72) Inventors: David Rafferty, Webster, TX (US); David Lorenz Gardner, League City, TX (US); James Wylde, Oak Leaf, TX (US)

(73) Assignee: 1st DETECT CORPORATION, Austin, TX (US)

( * ) Notice: Subject to any disclaimer, the term of this patent is extended or adjusted under 35 U.S.C. 154(b) by 0 days.

(21) Appl. No.: 13/794,761

(22) Filed: Mar. 11, 2013

(65) Prior Publication Data

US 2014/0252220 A1    Sep. 11, 2014

(51) Int. Cl.
| | |
|---|---|
| *H01J 49/02* | (2006.01) |
| *H01J 49/36* | (2006.01) |
| *H01J 49/00* | (2006.01) |
| *G06K 9/00* | (2006.01) |
| *H01J 49/42* | (2006.01) |

(52) U.S. Cl.
CPC ........... *H01J 49/0031* (2013.01); *H01J 49/022* (2013.01); *G06K 9/0051* (2013.01); *H01J 49/025* (2013.01); *H01J 49/429* (2013.01)

(58) Field of Classification Search
CPC .... G06K 9/0051; G06K 9/00496; H01J 49/02
USPC .................. 702/191, 193–195; 250/281, 282, 250/290–293
See application file for complete search history.

(56) References Cited

U.S. PATENT DOCUMENTS

| | | | |
|---|---|---|---|
| 4,540,884 A | * | 9/1985 | Stafford et al. ............... 250/282 |
| 5,640,011 A | * | 6/1997 | Wells ............................ 250/282 |
| 6,600,154 B1 | | 7/2003 | Franzen et al. |
| 6,878,929 B2 | | 4/2005 | Green et al. |
| 6,894,275 B2 | | 5/2005 | Green et al. |
| 6,982,413 B2 | | 1/2006 | Knecht et al. |
| 7,034,293 B2 | | 4/2006 | Wells |

(Continued)

FOREIGN PATENT DOCUMENTS

| | | |
|---|---|---|
| EP | 1367633 A2 | 12/2003 |
| WO | WO 2010/023706 A1 | 3/2010 |

OTHER PUBLICATIONS

Chou et al., Wavelet-based method for time-domain noise analysis and reduction in a frequency-scan ion trap mass spectrometer, J Am Soc Mass Spectrom. Nov. 2012;23(11):1855-64.*

(Continued)

*Primary Examiner* — Jack Berman
*Assistant Examiner* — James Choi
(74) *Attorney, Agent, or Firm* — Finnegan, Henderson, Farabow, Garrett & Dunner LLP

(57) ABSTRACT

A mass spectrometer comprising a controller configured to generate an RF signal to be applied to an electrode during the mass scan, wherein the electrode generates, based on the RF signal, an electric field to be applied to sample ions during a mass scan; an ion detector configured to detect sample ions passing through the electric field and generate a corresponding ion detection signal; and a sampling circuit configured to sample the ion detection signal; wherein the controller is configured to adjust a phase of the at least one RF signal relative to a sample timing of the sampling circuit and average successive mass scans to cancel a portion of the RF signal present in the ion detection signal.

20 Claims, 8 Drawing Sheets

(56) References Cited

U.S. PATENT DOCUMENTS

| | | |
|---|---|---|
| 7,161,142 B1 | 1/2007 | Patterson et al. |
| 7,265,346 B2 | 9/2007 | Whitehouse et al. |
| 7,928,365 B2 | 4/2011 | Oonishi et al. |
| 8,067,728 B2 | 11/2011 | Thomson et al. |
| 2005/0263696 A1* | 12/2005 | Wells .......................... 250/292 |
| 2006/0071665 A1* | 4/2006 | Blake et al. .................. 324/464 |
| 2006/0085142 A1* | 4/2006 | Mistrik .......................... 702/27 |
| 2009/0135970 A1 | 5/2009 | Miyagi et al. |
| 2011/0049353 A1 | 3/2011 | Gilbert et al. |
| 2013/0090884 A1* | 4/2013 | Glaser et al. ................. 702/104 |
| 2013/0181127 A1* | 7/2013 | Harada ......................... 250/288 |
| 2013/0311141 A1* | 11/2013 | Peng et al. .................... 702/191 |

OTHER PUBLICATIONS

International Search Report and Written Opinion dated Nov. 14, 2014 in related International Application No. PCT/US2014/019090, 8 pages.

* cited by examiner

MASS SPECTRUM NOISE CANCELLATION BY ALTERNATING INVERTED SYNCHRONOUS RF

FIELD OF THE DISCLOSURE

The present invention relates in general to mass spectrometry and, more particularly, to a mass spectrometer apparatus and methods of use.

BACKGROUND OF THE DISCLOSURE

Mass spectrometers are instruments used to analyze the mass and abundance of various chemical components in a sample. Mass spectrometers work by ionizing the molecules of a chemical sample, separating the resulting ions according to their mass-charge ratios (m/z), and then counting the number of ions at each m/z value. The resulting spectrum reveals the relative amounts of the various chemical components in the sample.

One type of mass analyzer used for mass spectrometry is called a quadrupole ion trap. Quadrupole ion traps take several forms, including, but not limited to, three-dimensional ion traps, linear ion traps, rectilinear ion traps, toroidal ion traps, planar ion traps and cylindrical ion traps. The operation in all cases, however, remains essentially the same. DC and time-varying radio frequency (RF) electric signals are applied to the electrode(s) to create electric fields within the ion trap. Those fields trap ions within the central volume of the ion trap. Then, by manipulating the amplitude or frequency of the electric fields, ions are selectively ejected from the ion trap in accordance with their m/z.

An ion detector records the number of ejected ions at each m/z as the ions arrive. A common type of ion detector is the channel electron multiplier (OEM). By cascading multiple secondary emissions of electrons, a OEM amplifies the original ion impact. Although the OEM can typically amplify the current by a factor of up to $10^7$, further amplification is necessary. For instance, ten singly charged ions being ejected from the ion trap per second creates a current of $1.6 \times 10^{-18}$ A. The OEM raises this current to $1.6 \times 10^{-11}$ A, which is still too small to output as a signal outside the instrument without amplification. Even for larger samples consisting of thousands of ions, the output signal is too small to be used as a reliable measurement. Thus, the output of the ion detector is typically increased by a conventional electronic amplifier. Finally, a computing device, such as a digital signal processor, field programmable gate array (FPGA) or a microprocessor, processes the resulting signal to produce a mass spectrum, or a chart showing the relative abundances of measured ions for each m/z.

Mass spectrometer designs are optimized for a combination of speed, sensitivity, and resolution depending on the particular application. A common approach to improving the sensitivity, or the minimum detection level for a particular chemical in a target sample, is to increase the number of ionized molecules. However, in samples consisting of two or more chemicals where one chemical is far more prevalent than the other(s), increasing the total number of ions may saturate the measurement of the most abundant chemical, thus reducing the dynamic range of the instrument, or the range of sample concentrations that can be measured. In addition, many applications require the detection of trace amounts of chemical which means that only a small number of molecules are available to be ionized and analyzed by the mass spectrometer, regardless of the relative amount of chemicals in the sample.

Another approach to improving sensitivity is by reducing the noise, or the unwanted components of the mass spectrum contributed by factors other than the detection of target ions. There are two different types of noise present in mass spectrometry. One is chemical noise, which may result from chemical contamination of the ion trap or ion detector, molecules being ionized but not being ejected to the detector at the appropriate time, or other means that result in detection of particles other than sample ions. The second is electrical noise either generated in or picked up by the ion detection circuitry. These noise sources produce a noise floor observed on the resulting mass spectrum. Any spectral peak corresponding to the presence of a compound that has an intensity less than this noise floor, or within a small ratio of signal to noise would not be detected. By reducing the noise level, the signal to noise ratio is improved, which in turn increases the probability of detecting small signals and also expands the dynamic range of the instrument.

A persistent mass spectrum electrical noise source is the high-voltage RF signal applied to the ion trap electrode(s), which couples to the ion detector amplifier. This source of noise is particularly troublesome in compact or miniaturized systems where shielding between the high-voltage components and the ion detection circuitry is minimal. Conventional filtering techniques may use additional signal processing circuitry or software to remove noise components from the ion detector amplifier output. However, several issues prevent such techniques from adequately removing the RF signal. First, the high-voltage RF signal may be similar in frequency content to the mass spectral output signal of the ion detector amplifier. Furthermore, the amplitude variation of the RF signal depends on several parameters, including the mass range and local temperature, and is therefore difficult for filter designers to model accurately. It also adds extra processing time which may adversely affect the performance of a fast instrument.

Alternatively, if the phase of the RF signal is set to be non-synchronous to the start of the spectrum scan for several repeated scans of a chemical sample, the RF signal noise can be averaged away over time, but this requires a large number of spectra to be averaged together in order to reduce the RF noise sufficiently. In applications where speed is important, such a method would take too much time. Furthermore, when detecting fast transient chemical signals, which may only exist in a small number of spectral scans before disappearing, averaging away the noise will also average away the desired signal.

Thus, there is a need for an RF noise cancellation system that does not affect the spectral signal and can be performed in real time with a minimal number of scans.

SUMMARY OF THE DISCLOSURE

The present disclosure is directed towards cancelling the noise in a mass spectrum resulting from an input RF signal coupling with the ion detector amplifier of a mass spectrometer. To operate the mass spectrometer, a digital signal processor (DSP) produces an RF signal, which is amplified by an amplifier. This high voltage RF signal is applied to an electrode of the instrument. In some embodiments, the mass spectrometer is a quadrupole mass analyzer. In other embodiments, the mass spectrometer comprises a cylindrical ion trap. In other embodiments, ion trap is a linear ion trap. In other embodiments, ion trap is a rectilinear ion trap. If the relative starting phase between the RF signal generator and sampling rate of the analog-to-digital converter (ADC) sampling the mass spectrum ion detector amplifier is made synchronous and controllable, then RF noise cancellation can be performed. In the preferred embodiment, RF noise cancellation is accomplished by alternating the phase of the RF signal applied to the ion trap by 180 degrees from one complete mass spectrum scan to the next. When even numbers of spectral scans are averaged together, the RF noise is inverted in half of the scans relative to the other half, and the RF noise cancels out. If precise synchronization is maintained between the RF signal and the sampling frequency of the mass spectrum ADC, then excellent RF noise cancellation can be accomplished using just two mass spectrum scans. In some embodiments, phase shifts other than 180 degrees, such as 90 degrees, for example, may be used, so long as the appropriate number of mass spectra are averaged together and the signals are made synchronous. This method therefore allows a very high signal to noise ratio with a minimum number of spectra required, as well as a minimal amount of processing complexity. The method is successful regardless of whether the RF noise is similar in frequency content to the mass spectrum signal. This method will also work for other signals used to control components in a mass spectrometer, such as the RF signals applied to the ion trap endcaps to perform ion ejection.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION OF THE EMBODIMENTS

Reference will now be made in detail to the embodiments of the present disclosure described below and illustrated in the accompanying drawings. Wherever possible, the same reference numbers will be used throughout the drawings to refer to same or like parts.

Embodiments consistent with the present disclosure relate to a mass spectrometer having an RF inverting mechanism to cancel out the electrical noise on the ion detector amplifier signal due to the RF signal applied to the ion trap electrode(s). To operate the ion trap of a mass spectrometer, a high-voltage RF signal is applied to the ion trap electrode(s). Some of the RF signal unintentionally couples to the ion detector amplifier. When the starting phase between the RF signal and the start of a spectrum scan is precisely controlled, then RF noise cancellation can be performed with the software and signal processing.

Several methods for noise cancellation are thus disclosed in greater detail below. In the preferred embodiment, RF noise cancellation is accomplished by alternating the phase of the RF signal applied to the ion trap by 180 degrees from one complete mass spectrum scan to the next. When even numbers of spectral scans are averaged together, the RF noise is inverted in half of the scans relative to the other half, and the RF noise cancels out. If precise synchronization is maintained between the RF signal and the start of the spectrum scans, then excellent RF noise cancellation can be accomplished using just two mass spectrum scans. In some embodiments, phase shifts other than 180 degrees, such as 90 degrees, for example, may be used, so long as the appropriate number of mass spectra are averaged together and the signals are made synchronous. This method therefore allows a very high signal-to-noise ratio with a minimum number of spectra required, as well as a minimal amount of processing complexity. The method is successful regardless of whether the RF noise is similar in frequency content to the mass spectrum signal. This method will also work for other signals used to control components in a mass spectrometer, such as for the RF applied to the ion trap end caps.

Figure 1A:
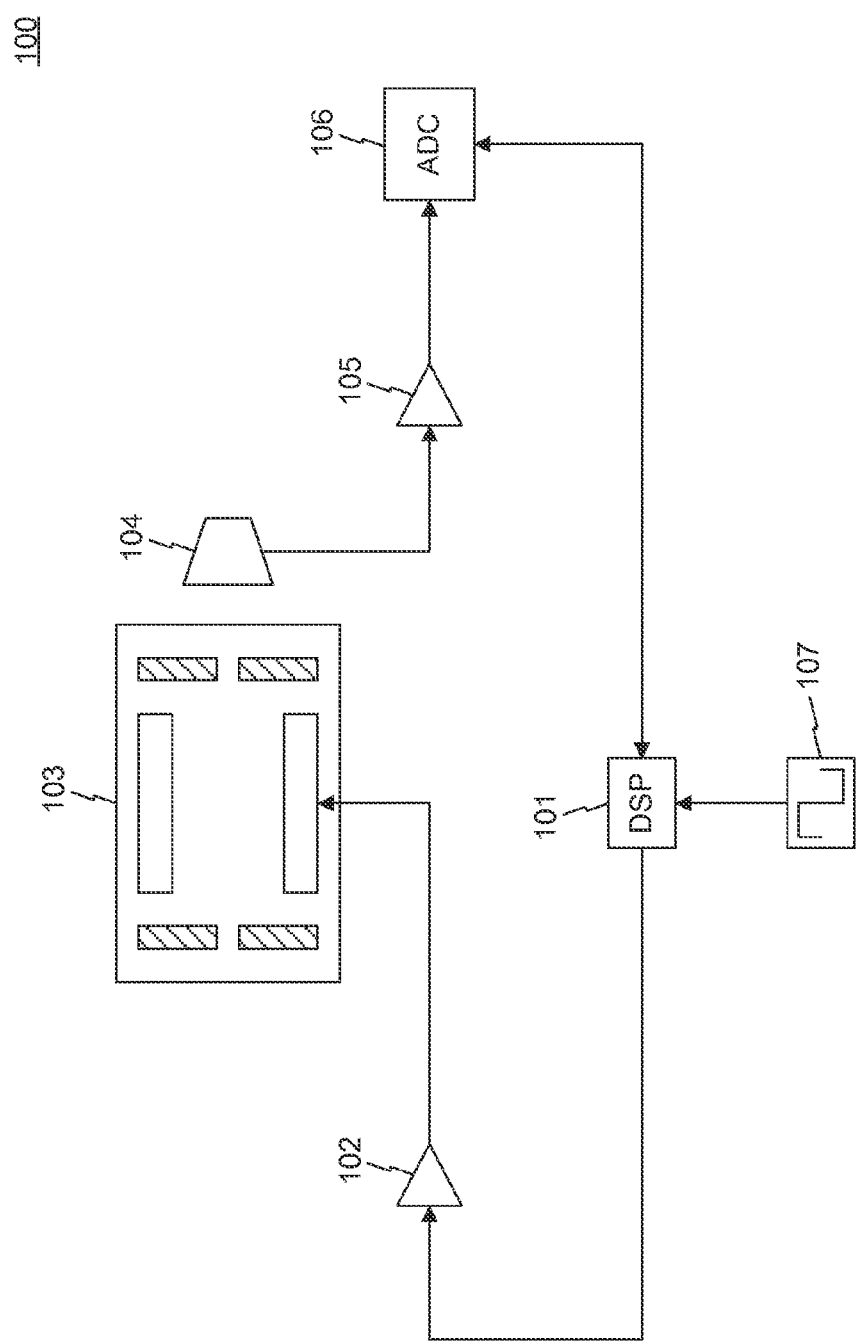
FIG. 1A shows a circuit block diagram illustrating an embodiment of the noise cancellation apparatus.
Figure 1B:
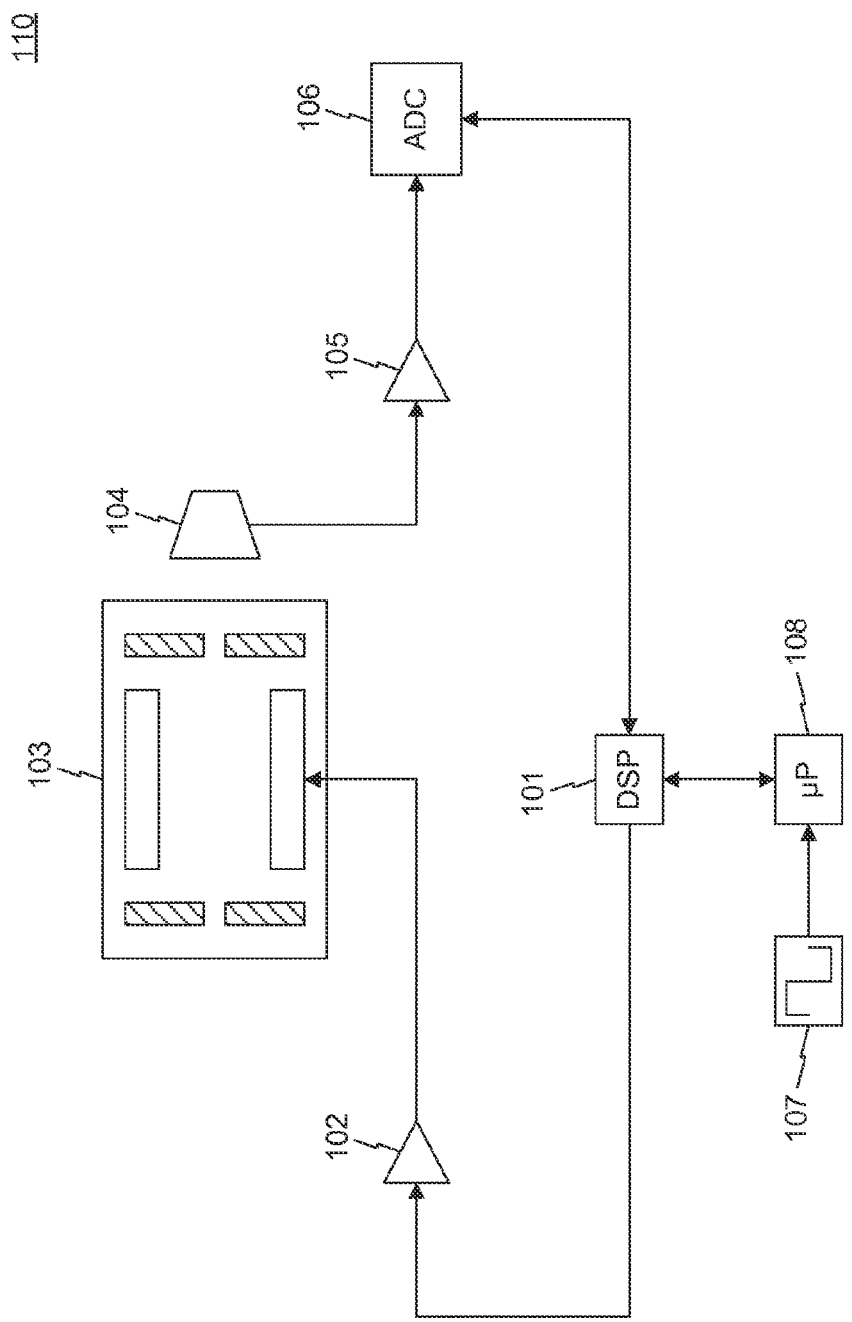
FIG. 1B shows a circuit block diagram illustrating an embodiment of the noise cancellation apparatus.

FIGS. 1A and 1B show several embodiments of the circuit block diagrams illustrating the noise cancellation apparatus. FIG. 1A is a schematic diagram of a mass spectrometer 100 according to an embodiment of the invention. Mass spectrometer 100 may be used, as known in the art, to analyze an ionized chemical sample. As shown in FIG. 1A, an example embodiment of spectrometer 100 may include a digital signal processor (DSP) 101 that produces an RF signal, which is amplified by an amplifier 102. In some embodiments, the RF signal 120 may have a frequency ranging from about 2.5 MHz to about 5 MHz and a maximum voltage of about 2 kVp. In a preferred embodiment, amplifier 102 is built as a separate subassembly to isolate it from the digital electronics as well as the sensitive analog electronics in the other subassemblies of the instrument. The high-voltage RF output of the amplifier 102 drives the center electrode in an ion trap 103. The ions are trapped in the ion trap 103 by the electric field, such as a quadrupole trapping field, generated by the electrodes of the ion trap 103.

To begin a spectrum scan, characteristics of the RF signal, such as the amplitude and frequencies, are adjusted. Each m/z has its own range of RF characteristics where ions of that m/z remain in the ion trap 103. Thus, when the range boundary for a particular m/z is crossed, ions of that m/z are selected ejected from the ion trap 103. An ion detector 104 converts ion impacts to a pre-amplified electrical current, and outputs an analog signal into an ion detector amplifier 105. In some embodiments, the ion detector 104 may be a channel electron multiplier (OEM), Faraday cup, multi-channel plate, or a device consisting of a series of dynodes, where each dynode produces more electrons or ions than does its predecessor, resulting in an amplified electric current as the output signal. Detector amplifier 105 may be a transimpedance type amplifier that converts a low level current signal to an amplified voltage signal.

The analog output of the ion detector amplifier 105 is converted into a digital signal by an analog-to-digital converter (ADC) 106. The DSP 101 collects the digital signal outputted by the ADC 106. Using the RF amplitude ramp information, the time at which ions are detected and previous mass calibration data, the DSP 101 produces a mass spectrum. This mass spectrum includes the electrical noise on the detector amplifier 105 source signal resulting from the high-voltage RF signal applied to the ion trap electrode(s) coupling to the ion detector amplifier 105. In some embodiments, the primary frequency components of the spectral peaks are similar to the frequency of the RF signal applied to the electrodes of the ion trap 103.

The DSP 101 runs two or more mass spectrum scans of a chemical sample. Since ionized molecules from a sample are discarded after a scan, a subsequent scan requires another portion of the sample to be ionized and inserted into the ion trap 103. In some embodiments, where the sample is assumed to be homogenous, which creates consistent spectrum scans. In other embodiments, where the relative chemical abundances vary from one portion of the chemical sample to another, averaging the spectrum scans indicates the relative chemical abundances for the sample portions collectively.

Between each scan, the DSP 101, aided by a clock 107, may shift the phase of the RF signal relative to the start of a spectrum scan. In some embodiments, the phase of the RF signal is shifted 180° between successive scans. In such an embodiment, the DSP averages the spectra from two, or any even number of, scans, and the components of the spectra due to the RF noise cancel onfe another out. In other embodiments, where the DSP averages 2n scans, where n is any integer greater than 0, the DSP shifts the RF phase of the input signal by increments of 180°/n between successive scans. For example, the noise in a single spectrum scan can be modeled as a pure sinusoidal function. The resulting total noise signal s(t) where the noise for each scan k is a sinusoidal function with amplitude A, frequency f, and phase $\phi_k$ is shown in Equation 1:

$$s(t) = \sum_{k=0}^{2n-1} A\sin(2\pi ft + \varphi_k) \quad (1)$$

The sinusoidal function may take a radian number as its argument, and the phase $\phi_k$ for each scan k is indicated in Equation 2:

$$\varphi_k = \left(\frac{\pi}{n}\right)k\,\text{rad} = \left(\frac{180°}{n}\right)k \quad (2)$$

By symmetry, it can be shown that for all f, t, and integer values of n>0, s(t)=0, i.e. zero noise. Although the vast majority of mass spectrometer designs will incorporate a sinusoidal RF source, a mass spectrometer may use a non-sinusoidal RF waveform. This cancellation technique will work for RF signals other than single sinusoids so long as the RF signal is periodic and exhibits half-wave symmetry. Alternate RF signal types include, but are not limited to: square waves (50% duty cycle), triangle waves, and any signal that is composed of the sum of a sine wave and odd harmonics of that sine wave. This cancellation technique also reduces, but does not completely eliminate, noise coupled from RF signals that do not have half-wave symmetry. For these signals, such as a square wave with a duty cycle other than 50%, the technique may move the bandwidth of the resulting noise away from the bandwidth of the spectral signal, allowing the noise to be filtered by conventional means. For these types of waveforms, using higher values of n will multiply the frequency content of the averaged noise further as n increases.

In another embodiment, where the RF signal is periodic but does not exhibit half-wave symmetry, the RF can be cancelled by having the digital signal processor generate an inverted waveform for alternating scans. For example, if the RF waveform is a saw tooth wave, then a 180 degree phase shift won't provide complete cancellation. However, alternating a saw tooth waveform with an inverted saw tooth waveform will provide complete cancellation. This way the RF noise can still be eliminated by using waveform inversion. However, for this method to be successful, the mass spectrometer must operate similarly with the RF waveform and the inversion of the RF waveform.

In another embodiment, as shown in FIG. 1B, a microprocessor 108, aided by the clock 107, controls and interfaces with the DSP 101. The DSP 101 and the clock 107 may be integrated with the microprocessor 108 as a single device. The microprocessor 108 may interface with a user of the mass spectrometer or with other computing devices, either locally or remotely. In some embodiments, the microprocessor 108 may provide control algorithms to the DSP 101 in addition to RF noise cancellation. In some embodiments, a display (not shown) and one or more user input devices (not shown) can be attached to the microprocessor.

Figure 2A:
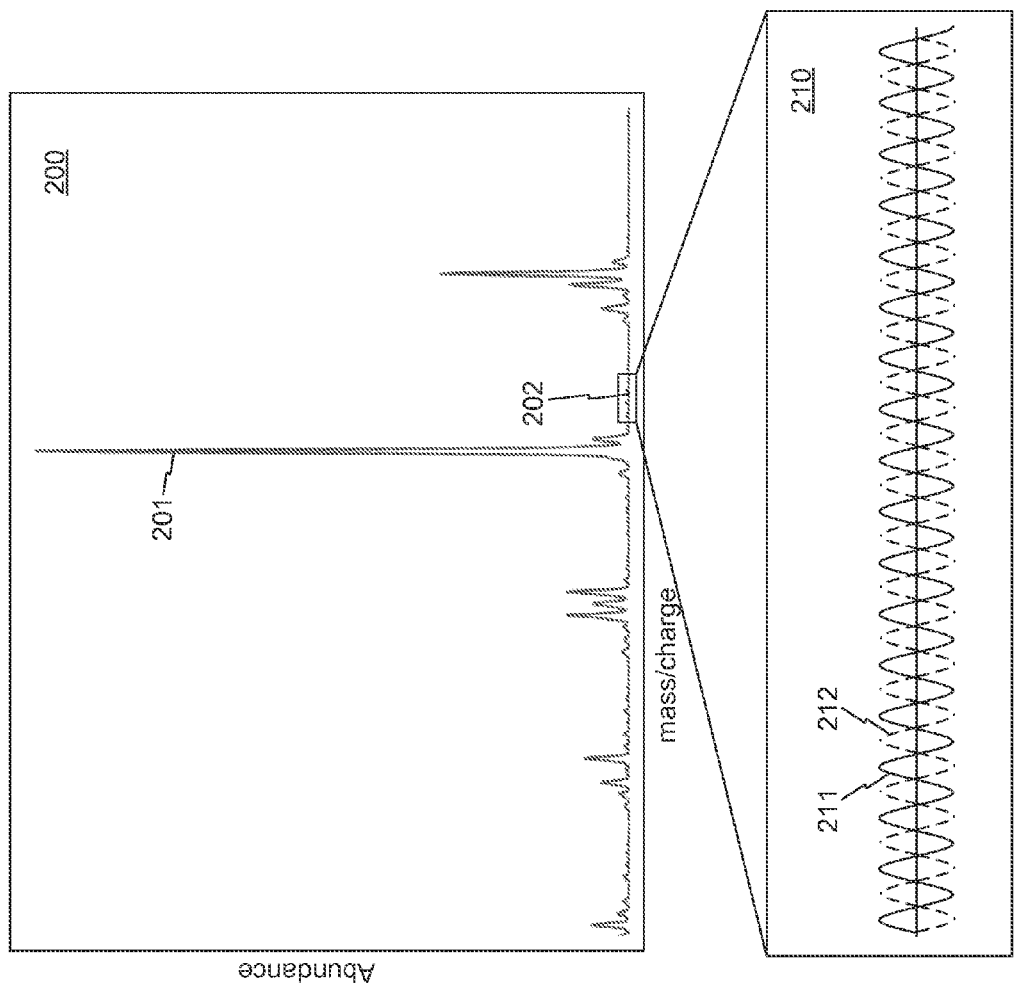
FIG. 2A shows an exemplary spectrum.
Figure 2B:
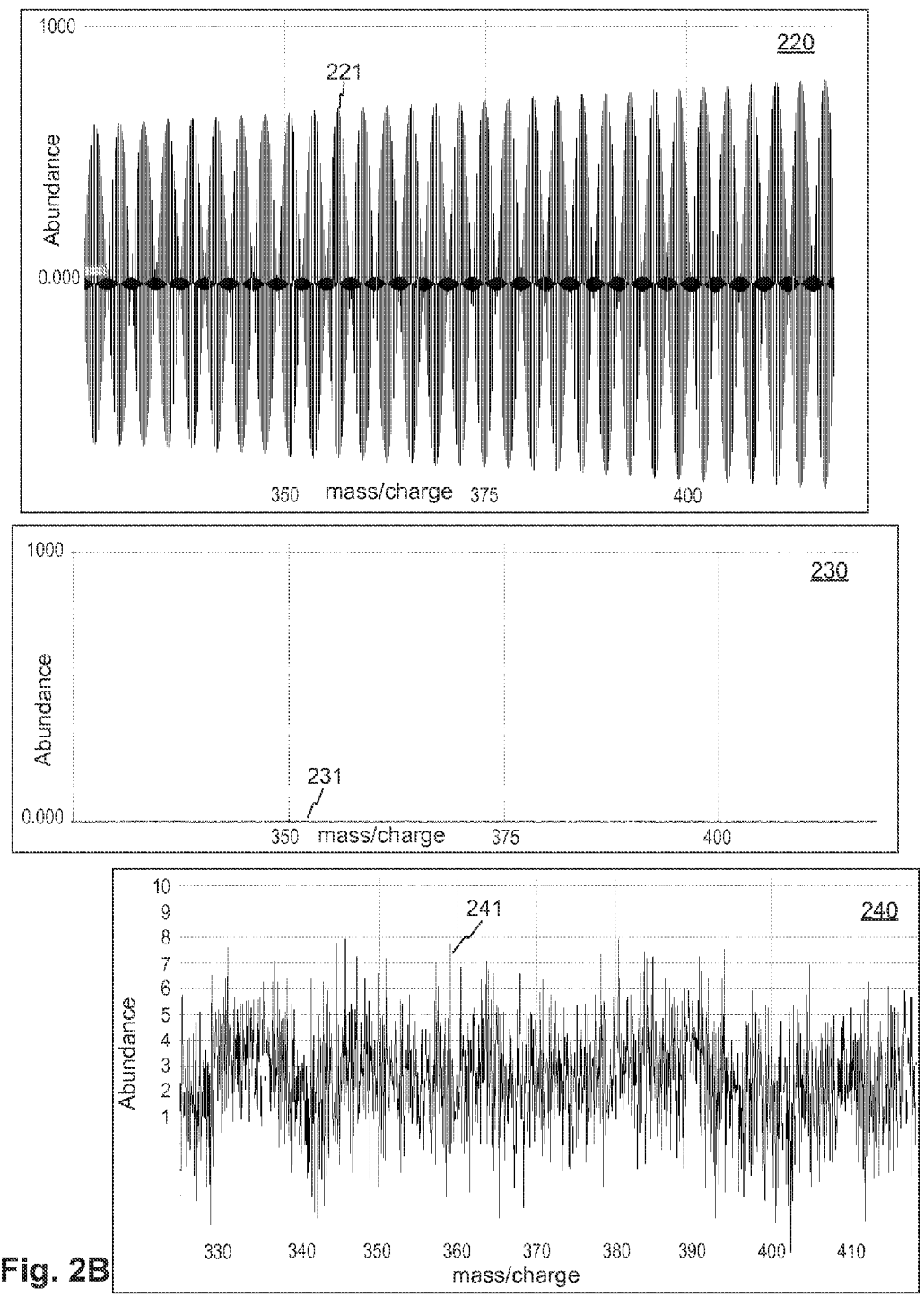
FIG. 2B shows exemplary spectra.
Figure 2C:
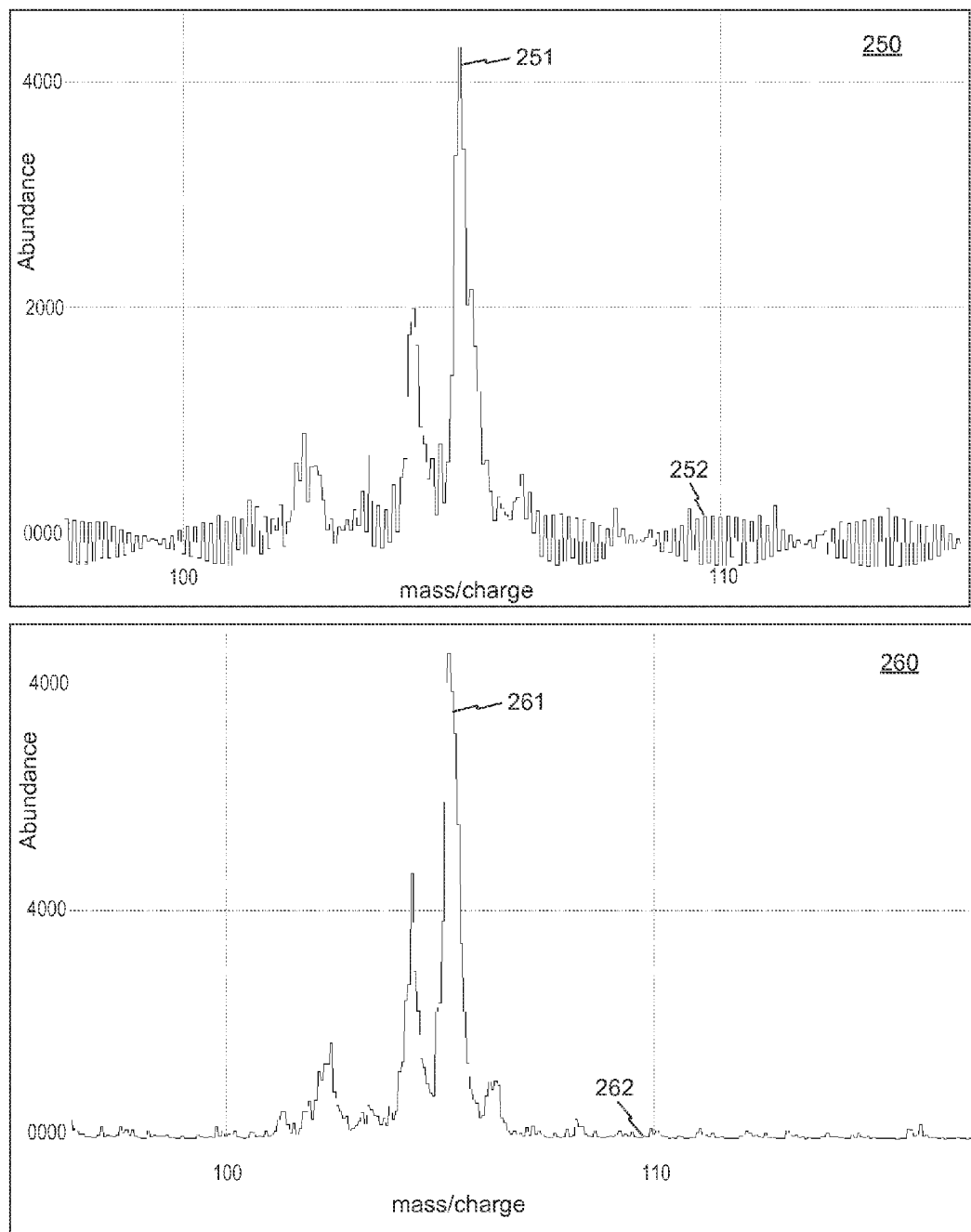
FIG. 2C shows exemplary spectra.

FIGS. 2A, 2B, and 2C show several exemplary spectra with and without RF noise cancellation. First, FIG. 2A depicts an example spectrum 200 with an expanded view of the noise floor. Spectrum 200 shows the mass spectrum that is the digitized form of the analog signal produced by the ion detector amplifier 104, indicating the relative abundance of detected ions versus the m/z ratio. Peak 201 is an exemplary indicator of a high concentration of one particular chemical compound in the sample. Area 202 is expanded to give an example of RF noise 211 in a single spectrum scan caused by coupling of the RF signal with the ion signal. Although depicted here as a sinusoid, RF noise 211 may manifest in various ways depending on how the high-voltage RF is generated and how it has coupled into the ion detection circuitry. For example the RF noise may more closely approximate a square wave, a pulse train, saw tooth, or any other periodic waveform. The RF is controlled by DSP 101, which also clocks the ADC. As such, the periodic RF noise 211 will have constant phase relative to the sample times of ADC 106. The DSP 101 can thus reverse the polarity of the high-voltage RF with each successive scan. By reversing the polarity of the RF signal in a subsequent scan, the RF noise 211 is inverted by shifting the RF signal 180° to produce RF noise 212. DSP 101 can then either add or average these two scans together, canceling out RF noise 211 and RF noise 212 and substantially lowering the noise floor. As described in the embodiments described by FIG. 3B, any even number of scans can be averaged. By extension, FIG. 3C describes embodiments where similar RF noise reduction is achieved when other total numbers of scans and RF signal phase shifts are performed.

In order for the noise cancelling techniques described in this application to be successful, several strict requirements must be met and the electronics and software have to be specifically designed in order to meet these requirements. For example, for an RF signal on the order of 5 MHz to be sufficiently cancelled, the timing and synchronization must be very precise and must be controlled by electronics whose output must not deviate by even one clock cycle. This suggests using a precise timing device such as an FPGA to generate the timing and RF signals without intermittent clock cycles that may be introduced by a typical processor running outside of an interrupt routine. For optimal performance, the clocking source must have low clock jitter and there must be one clocking device that is the source for both the RF generator and the ADC sampling clock. Otherwise, two independent clock sources would drift relative to each other and reduce the quality of the cancellation. This requires a digitally generated RF signal whose phase can be set precisely and repeatedly from one sample scan to the next. In addition, the ion trap end cap voltages must be accounted for. There is usually a precise phase relationship between the primary RF waveform and the excitation voltage waveforms applied to an ion trap end cap electrodes. When the primary RF is alternated in phase, the relationship must also be alternated appropriately in order for the ion trap to operate optimally. Depending upon the frequency division applied to the end caps (even or odd integer division) the end cap signal phase will require different treatment in software.

When the components of electrical noise resulting from the RF signal coupling to the ion detector are removed, the noise floor is significantly lowered, enabling the mass spectrometer to detect smaller quantities of chemicals in a sample. In some embodiments, other noise reduction techniques, including both chemical noise and electrical noise reduction, may be applied as well, further improving the sensitivity of the instrument.

FIG. 2B shows exemplary spectra taken when no chemical samples are introduced into the instrument to compare the noise floor with and without noise cancellation. All three spectra are the average of 10 individual spectrum scans with no additional filtering of the ion detector output. Spectrum 220 shows a spectrum taken in the synchronization ("sync") mode, where the RF signal is synchronous to the detector sampling and is not being phase shifted between successive scans. Thus, no noise cancellation is being performed. The resulting noise signal 221 is an aliased sine wave, as the ADC sampling rate is less than the Nyquist rate for the RF signal. Note that the noise has a peak-to-peak value of approximately 1000 ions. Spectrum 230 shows a spectrum taken in the "no sync" mode, where the RF signal is shifted by a 180° phase shift between successive scans to achieve noise cancellation. The resulting noise signal 231 is far smaller than the noise signal 221 from the "sync" mode. To examined the noise signal 231 in greater detail, spectrum 240 is an expanded view of spectrum 230, showing a zoomed view 241 of the noise signal 231. The noise has a peak-to-peak value of approximately 12 ions at most, indicating a significant improvement from the raw noise signal 221.

FIG. 2C shows exemplary spectra taken when a xylene sample at a concentration of 15 ppm is introduced into the instrument both with and without noise cancellation. Both spectra are the average of 10 individual spectrum scans with no additional filtering of the ion detector output. Spectrum 250 shows a spectrum taken in the "sync" mode, where no noise cancellation is performed. Spectrum 250 has a large central peak 251, indicating a particular ion with a nominal abundance of approximately 4200 counts. Since the baseline starts at 200 counts, the adjusted value for the peak is about 4000 counts. The noise signal 252 is a beat pattern with an average noise level of about 200 counts, producing a signal-to-noise ratio of approximately 20. Spectrum 260 shows a spectrum taken in the "no sync" mode, where noise cancellation is performed. The spectrum 260 has a similar large central peak 261 with a height of 4200 counts. Since the baseline is about 110, the adjusted value for the peak is about 4090. The noise signal 262 is a beat pattern with an average noise level of about 3.5 counts, producing a signal-to-noise ratio of approximately 1170. Thus, noise cancellation increased sensitivity and dynamic range by a factor of more than 50.

Figure 3A:
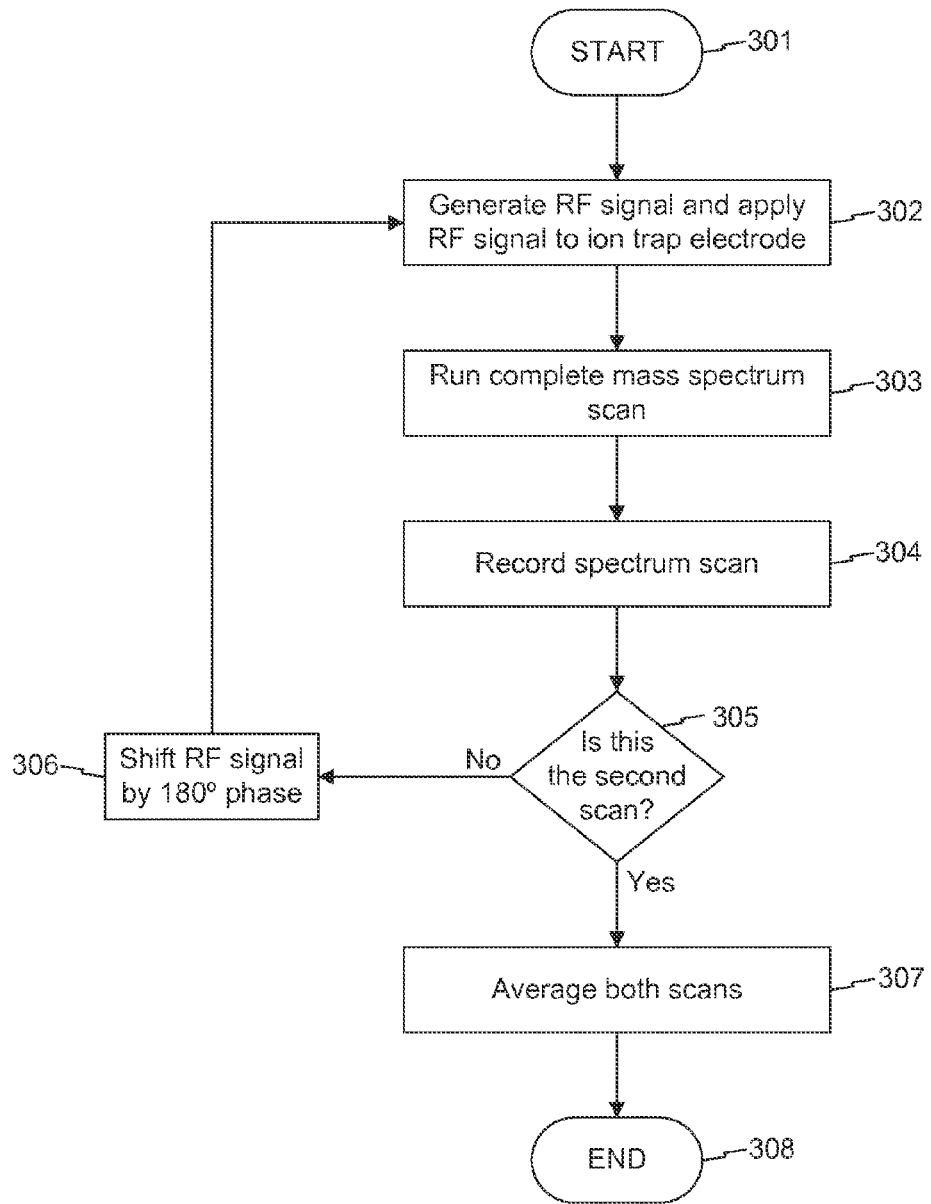
FIG. 3A shows an exemplary flow chart illustrating steps in methods for noise cancellation using two spectrum scans.
Figure 3B:
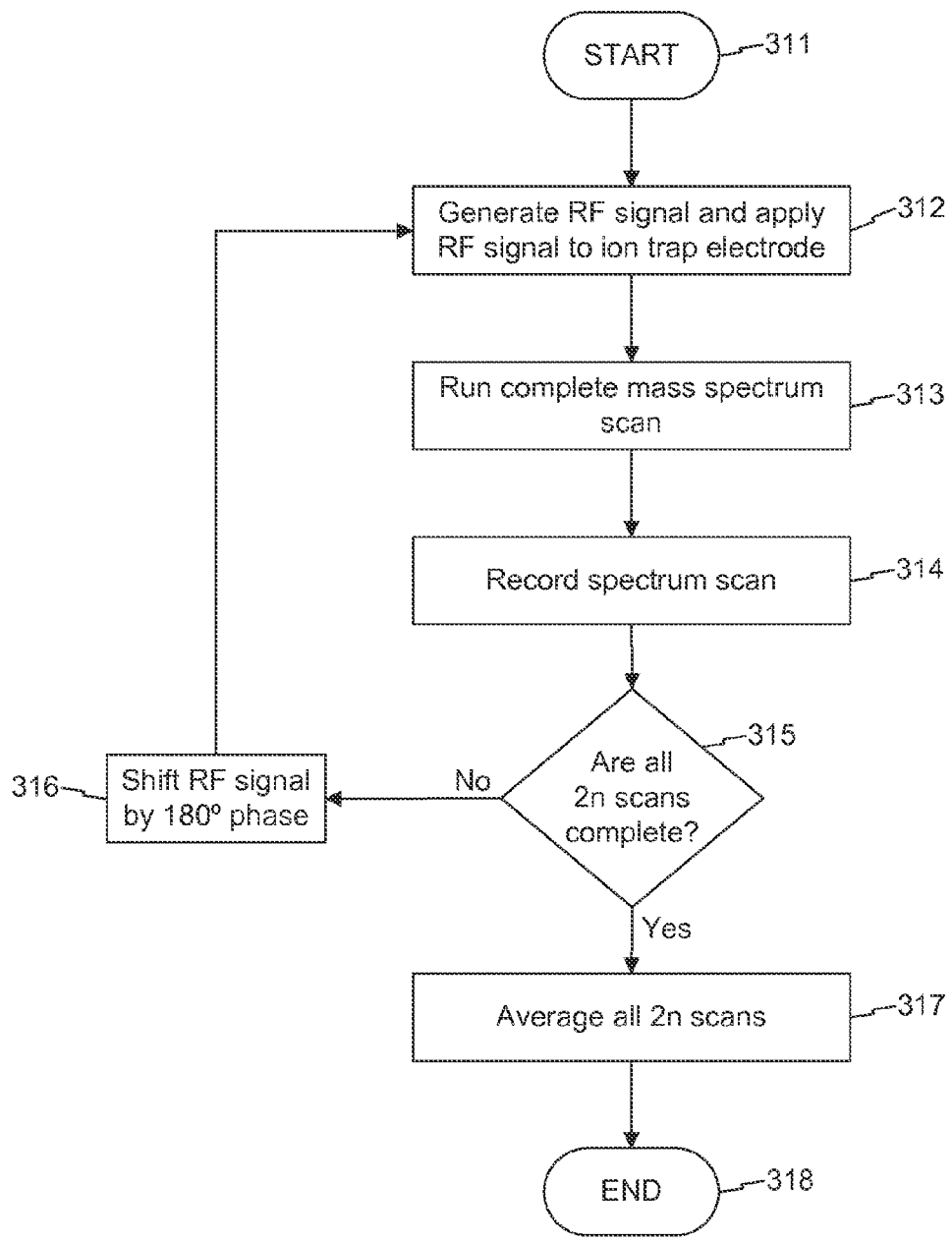
FIG. 3B shows an exemplary flow chart illustrating steps in methods for noise cancellation using an even number of spectrum scans.
Figure 3C:
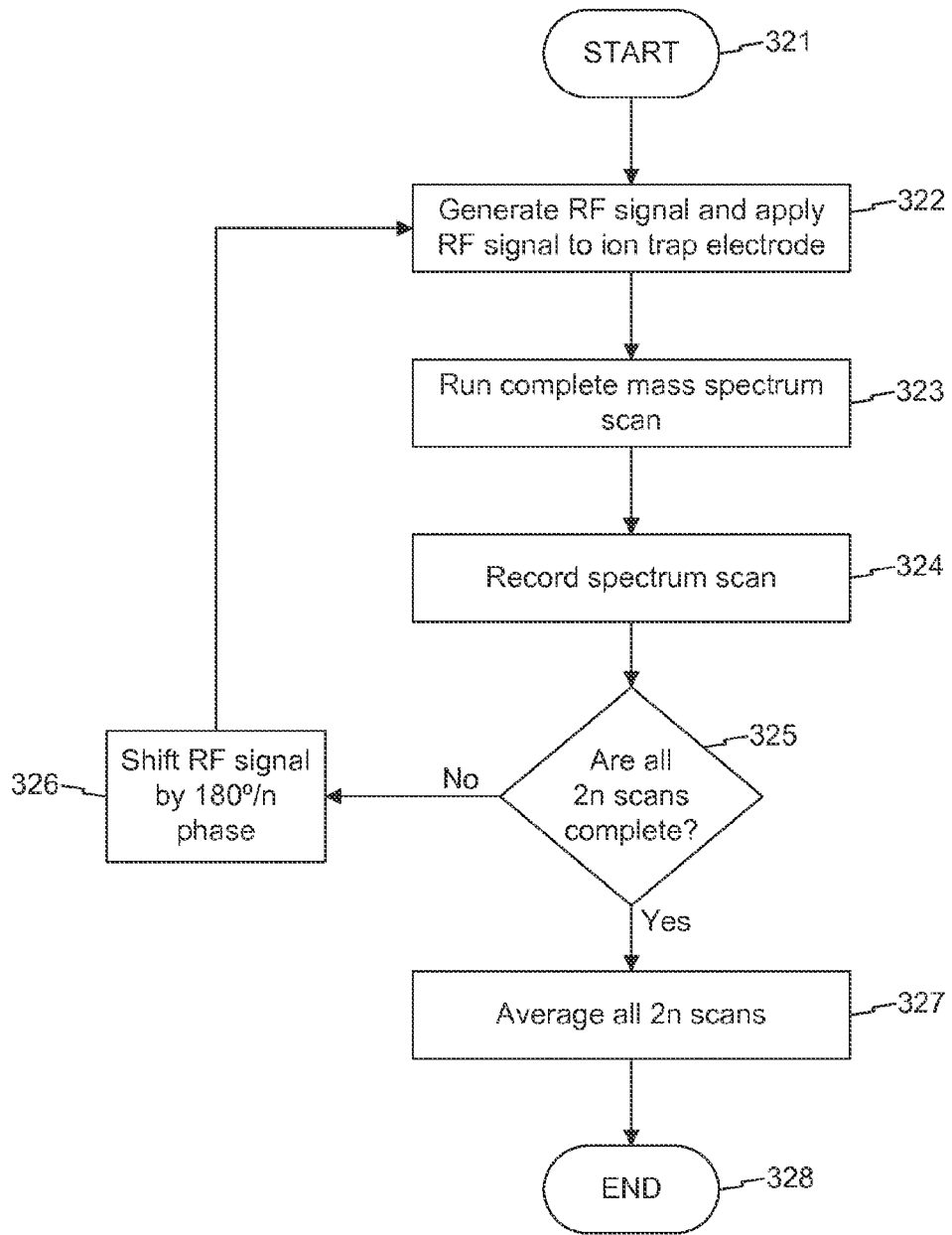
FIG. 3C show an exemplary flow chart illustrating steps in methods for noise cancellation using a fixed number of spectrum scans.

FIGS. 3A, 3B, and 3C show several exemplary flow charts illustrating steps in methods for noise cancellation. FIG. 3A illustrates a process 300, that begins at step 301, for cancelling the RF noise in mass spectrometer 100 using two spectrum scans. In the embodiment shown in FIG. 3A, DSP 101 generates an RF signal and applies it to the ion trap electrode(s) in step 302. The mass spectrometer runs a complete spectrum scan in step 303, and DSP 101 records the spectrum scan in step 304. If this was the first scan, as decided in step 305, DSP 101 uses the phase shifter 107 to shift the RF signal by 180° in step 306, and runs another scan. If this was the second scan, DSP 101 averages both scans in step 307, and the procedure ends at step 308. The resulting data may be further processed for display to the user and recording to a storage medium.

Another embodiment is shown in FIG. 3B, where a process 310 beginning at step 311 cancels the RF noise in mass spectrometer 100 using an even number of spectrum scans 2n. DSP 101 generates an RF signal and applies it to the ion trap electrode(s) in step 312. The mass spectrometer runs a complete spectrum scan in step 313, and DSP 101 records the spectrum scan in step 314. If not all 2n scans have been completed, as decided in step 315, DSP 101 uses the phase shifter 107 to shift the RF signal by 180° in step 316, and runs another scan. If all 2n scans have been completed, DSP 101 averages all 2n scans in step 317, and the procedure ends at step 318. The resulting data may be further processed for display to the user and recording to a storage medium.

Yet another embodiment is shown in FIG. 3C, where a process 320 beginning at step 321 cancels the RF noise in mass spectrometer 100 using a fixed number of spectrum scans 2n and a phase shift of 180°/n. DSP 101 generates an RF signal and applies it to the ion trap electrode(s) in step 322. The mass spectrometer runs a complete spectrum scan in step 323, and DSP 101 records the spectrum scan in step 324. If not all 2n scans have been completed, as decided in step 325, DSP 101 uses the phase shifter 107 to shift the RF signal by 180°/n in step 326, and runs another scan. If all 2n scans have been completed, DSP 101 averages all 2n scans in step 327, and the procedure ends at step 328. The resulting data may be further processed for display to the user and recording to a storage medium.

The foregoing description, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. The steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A mass spectrometer, comprising:
a controller configured to generate a radio frequency (RF) signal to be applied to an electrode during a mass scan, wherein the electrode generates, based on the RF signal, an electric field to be applied to sample ions during the mass scan;
an ion detector configured to detect sample ions passing through the electric field and generate a corresponding ion detection signal; and
a sampling circuit configured to sample the ion detection signal according to a sampling timing;
wherein the controller is configured to perform successive mass scans and the RF signal has a predetermined phase relationship with the sampling timing in each of the successive mass scans, and the controller is configured to adjust a phase of the RF signal relative to the sampling timing of the sampling circuit and average the successive mass scans to cancel a portion of the RF signal present in the ion detection signal.

2. The mass spectrometer of claim 1, wherein the phase is adjusted by 360/N degrees between successive scans, and N mass scans are averaged to cancel a portion of the RF signal present in the ion detection signal.

3. The mass spectrometer of claim 2, wherein the phase is adjusted by 180 degrees between successive scans, and wherein an even number of mass scans are averaged to cancel a portion of the RF signal present in the ion detection signal.

4. The mass spectrometer of claim 3, wherein the phase is adjusted by 180 degrees between successive scans, and wherein two mass scans are averaged to cancel a portion of the RF signal present in the ion detection signal.

5. The mass spectrometer of claim 1, wherein the mass spectrometer is a quadrupole mass analyzer.

6. The mass spectrometer of claim 1, wherein the mass spectrometer comprises an ion trap.

7. The mass spectrometer of claim 6, wherein the ion trap is at least one of a linear ion trap or a rectilinear ion trap.

8. The mass spectrometer of claim 6, wherein the ion trap is a cylindrical ion trap.

9. The mass spectrometer of claim 1, wherein the controller comprises a digital signal processor.

10. The mass spectrometer of claim 1, wherein the controller and the sampling circuit use a common clock signal.

11. A method of cancelling radio frequency (RF) noise in a mass spectrometer, comprising:
   generating, by a controller, an RF signal during a mass scan;
   amplifying the RF signal and using the amplified RF signal to drive an electrode;
   detecting ions in the mass spectrometer with an ion detector and outputting an ion detection signal;
   sampling the ion detection signal with a sampling circuit, wherein the sampling is performed according to a sampling timing;
   adjusting, between successive mass scans, a phase of the RF signal relative to the sampling timing, wherein the RF signal has a predetermined phase relationship with the sampling timing; and
   averaging successive mass scans to cancel a portion of the RF signal present in the ion detection signal.

12. The method of claim 11, wherein the phase is adjusted by 360/N degrees between successive scans, and N mass scans are averaged to cancel a portion of the RF signal present in the ion detection signal.

13. The method of claim 12, Wherein the phase is adjusted by 180 degrees between successive scans, and an even number of mass scans are averaged to cancel a portion of the RF signal present in the ion detection signal.

14. The method of claim 12, wherein the phase is adjusted by 180 degrees between successive scans, and two mass scans are averaged to cancel a portion of the RF signal present in the ion detection signal.

15. The method of claim 11, wherein the mass spectrometer is a quadrupole mass analyzer.

16. The method of claim 11, wherein the mass spectrometer comprises an ion trap.

17. The method of claim 16, wherein the ion trap is at least one of a linear ion trap or a rectilinear ion trap.

18. The method of claim 16, wherein the ion trap is a cylindrical ion trap.

19. The method of claim 11, wherein the controller comprises a digital signal processor.

20. The method of claim 11, wherein the controller and the sampling circuit use a common clock signal.

* * * * *